United States Patent [19]

Toda

[11] 4,173,009

[45] Oct. 30, 1979

[54] ULTRASONIC WAVE TRANSDUCER

[76] Inventor: Kohji Toda, 2069C-209, Futaba 1-chome, Yokosuka-shi, Kanagawa-ken, Japan

[21] Appl. No.: 844,291

[22] Filed: Oct. 21, 1977

[30] Foreign Application Priority Data

Mar. 24, 1977 [JP] Japan .................................. 52/31507

Jul. 23, 1977 [JP] Japan ............................ 52/97790[U]

[51] Int. Cl.[2] ............................................. H04B 13/00

[52] U.S. Cl. .................................... 367/164; 310/334; 367/152

[58] Field of Search .................. 340/8, 10, 9; 310/334

[56] References Cited

U.S. PATENT DOCUMENTS 3,343,105 9/1967 Vander Pauw .................. 310/334 X 3,401,360 9/1968 Schulz-DuBois ................ 310/334 X 3,745,812 7/1973 Korpel ............................. 310/334 X

OTHER PUBLICATIONS

Split Interdigital Transducers, E. Rabinowicz, IBM, vol. 13, No. 11, Apr. 1971.

*Primary Examiner*—Harold Tudor

*Attorney, Agent, or Firm*—Burgess, Ryan and Wayne

[57] ABSTRACT

An ultrasonic wave transducer which can generate a convergent ultrasonic sound beam. The transducer comprises liquid contained in a housing, a piezoelectric material in said liquid, and interdigital electrode arranged on the surface of said piezoelectric material, an alternating voltage being applied to said interdigital electrode.

5 Claims, 9 Drawing Figures

ULTRASONIC WAVE TRANSDUCER

BACKGROUND OF THE INVENTION

The present invention relates to a transducer for generating ultrasonic wave energy, and in particular relates to a transducer which can generate a convergent ultrasonic wave.

Although a medium is opaque optically, it is possible to view the internal structure of said medium as long as the medium is acoustically transparent; as in x-ray photography. Photographs produced using ultrasonic wave energy are applicable to those fields where the medium is optically opaque, including medical applications, microscopes, nondestructive testing, underwater observation, and/or earthquake research.

Various ultrasonic wave transducers for the generation of a focused ultrasonic wave have been proposed. Some of them utilize an acoustic phase shift plate, a circular array, an acoustic lens, or a photo-acoustic transducer. However, the above prior art techniques are insufficient or unduly complicated for focusing ultrasonic waves in the application of viewing the internal structure of a medium.

SUMMARY OF THE INVENTION

It is an object, therefore, of the present invention to overcome the disadvantages and limitations of the prior ultrasonic wave transducers by providing a new and improved ultrasonic wave transducer.

The above and other objects are attained by an ultrasonic wave transducer comprising liquid contained in a housing, a piezoelectric material in said liquid, an interdigital electrode arranged on the surface of said piezoelectric material, with an alternating voltage being applied to said electrode.

BRIEF DESCRIPTION OF THE DRAWINGS

The foregoing and other objects, features, and attendant advantages of the present invention will be better appreciated as the same become better understood by means of the following description and accompanying drawings.

DESCRIPTION OF THE PREFERRED EMBODIMENTS

Figure 1:
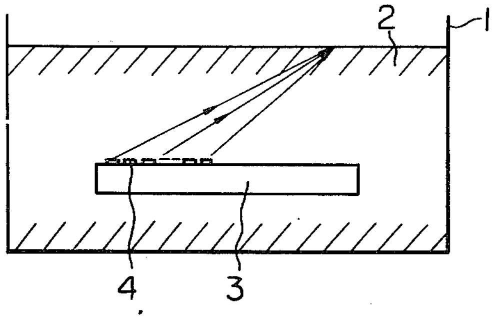
FIG. 1 shows the structure of an ultrasonic wave transducer according to the present invention.

FIG. 1 shows the structure of the present ultrasonic wave transducer. In FIG. 1, the liquid 2 is contained in the housing 1, and a piezoelectric material 3 having the interdigital electrode 4 on the surface is thereof immersed in the liquid 2. Some of the possible examples of the liquid 2 are water, ether, acetone, and glycerine.

Figure 2A:
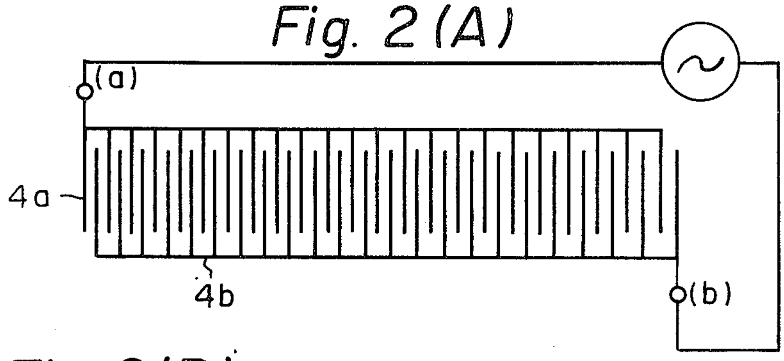
FIG. 2(A), FIG. 2(B), FIG. 2(C) and FIG. 2(D) show various embodiments of the interdigital electrode 4 utilized in the transducer of FIG. 1.
Figure 2B:
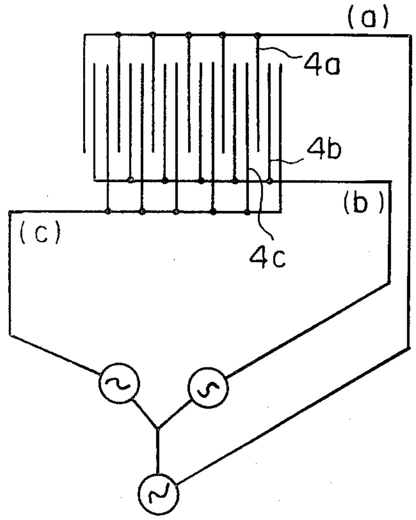
Figure 2C:
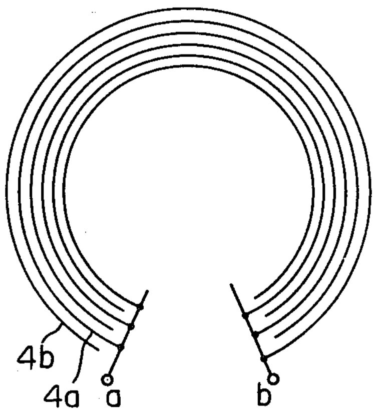
Figure 2D:
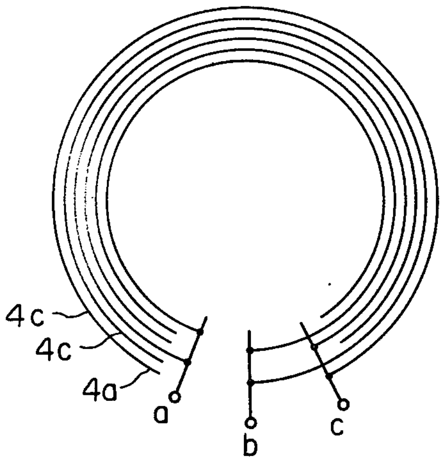

Some of the possible structures of the interdigital electrode 4 are shown in FIGS. 2(A) through 2(D). FIG. 2(A) shows a single phase electrode in which a pair of comb-shaped electrodes 4(*a*) and 4(*b*) are interdigitally arranged so that each finger of each electrode appears alternately, and a single phase alternating voltage is supplied to the pair of terminals (a) and (b) of the electrodes. FIG. 2(B) shows a three phase electrode in which three comb-shaped electrodes 4(*a*), 4(*b*) and 4(*c*) are interdigitally arranged on the surface of the piezoelectric material 3 so that each finger of each electrode is alternately arranged and the period of each finger belonging to the same electrode is three, and a three phase alternating voltage is applied to the terminals (a), (b) and (c). FIG. 2(C) is the embodiment of the single phase circular electrode, and FIG. 2(D) shows a three phase circular electrode.

The single phase electrode in FIG. 2(A) or FIG. 2(C) provides a pair of ultrasonic wave beams in opposite directions to each other while the three phase electrode in FIG. 2(B) or FIG. 2(D) can provide a single ultrasonic wave beam in a predetermined direction. The electrode in FIG. 2(A) and FIG. 2(B) can provide a focal line, that is to say, the sound beam converges on a line, while the electrode in FIG. 2(C) and FIG. 2(D) can provide a focal point, that is to say, the sound beam converges on a particular point.

The preferable material for the electrode is for instance a combination of layers of chrome(Cr) and gold-(Au), which is highly water resistant. Some of the preferable materials for the piezoelectric transducer are $LiNbO_3$, crystallized $SiO_2$, $Bi_{12}GeO_{20}$, and ceramic of the $Pb(Zr, Ti)O_3$ group (for instance "91-A" produced by TDK Electronics., Tokyo, Japan).

Figure 3:
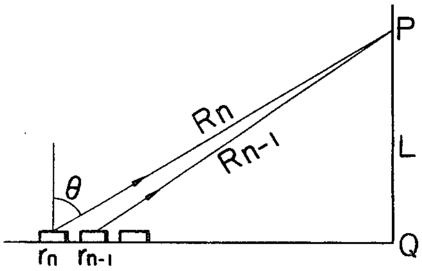
FIG. 3 illustrates the operational principle of the present invention respecting FIGS. 2(A) and 2(B)
Figure 4:
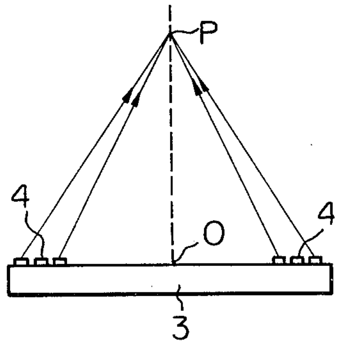
FIG. 4 illustrates the operational principle of the present invention respecting FIGS. 2(C) and 2(D)

Now, the operation of the interdigital electrode will be explained with reference to FIG. 3 and FIG. 4, in which FIG. 3 relates to the electrode in FIG. 2(A) and FIG. 2(B), and FIG. 4 relates to the electrode in FIG. 2(C) and FIG. 2(D).

The relationship between the wavelength $\lambda_f$ in the liquid of a sound wave of frequency f and the direction ($\theta$) of the strongest sound beam is shown in the following formula which coincides with the experimental result obtained.

$$\sin\theta = \lambda_f/d \qquad (1)$$

where d is the length of one period of the electrode. Therefore, the condition that the sound generated at each point of the electrode focuses at the point P, that is to say, the condition that the sound generated at each point passes the point P and is in phase at point P, is shown in the formula (2) below.

$$r_n^2 = R_n^2 - L^2 = k_1 n \lambda_f L + k_2 n^2 \lambda_f^2 \qquad (2)$$

where $r_n$ is the distance between the n th electrode and the point Q, $R_n$ is the distance between the n th electrode and the point P, and $k_1$ and $k_2$ are constants. The set of values ($k_1$, $k_2$) is (1, ¼) for the single phase electrode shown in FIG. 2(A), and is (⅔, 1/9) for the three phase electrode shown in FIG. 2(B). The desired period of the electrode can be obtained by calculating the formulas (1) and (2) using a computer.

Next, the following table shows the experimental result of the angle $\theta$ of the sound beam radiation for some combination of piezoelectric materials and liquids.

| Liquid and sound velocity(20° C.) \ Piezoelectric material and surface acoustic wave velocity | $LiNbO_3$ 131°rot Y,X (4000m/sec) | Quartz Y,X (3159m/sec) | $Bi_{12}GeO_{20}$ (111),(110) (1708m/sec) | Piezo electric Ceramic (91A) (2100m/sec |
|---|---|---|---|---|
| Water (1482.6m/sec) | 21.8° | 28.0° | 60.24° | 44° |
| Ether (1006m/sec) | 14.6° | 18.6° | 36° | 28.2° |
| Acetone (1190m/sec) | 17.3° | 22.1° | 44.2° | 34.0° |
| Glycerine (1923m/sec) | 28.7° | 37.5° | / | 64.5° |

It is apparent from the above table that when a small value of $\theta$ is desired, the combination of a liquid of low speed sound velocity and a piezoelectric material of high speed surface wave velocity is preferable.

Figure 5:
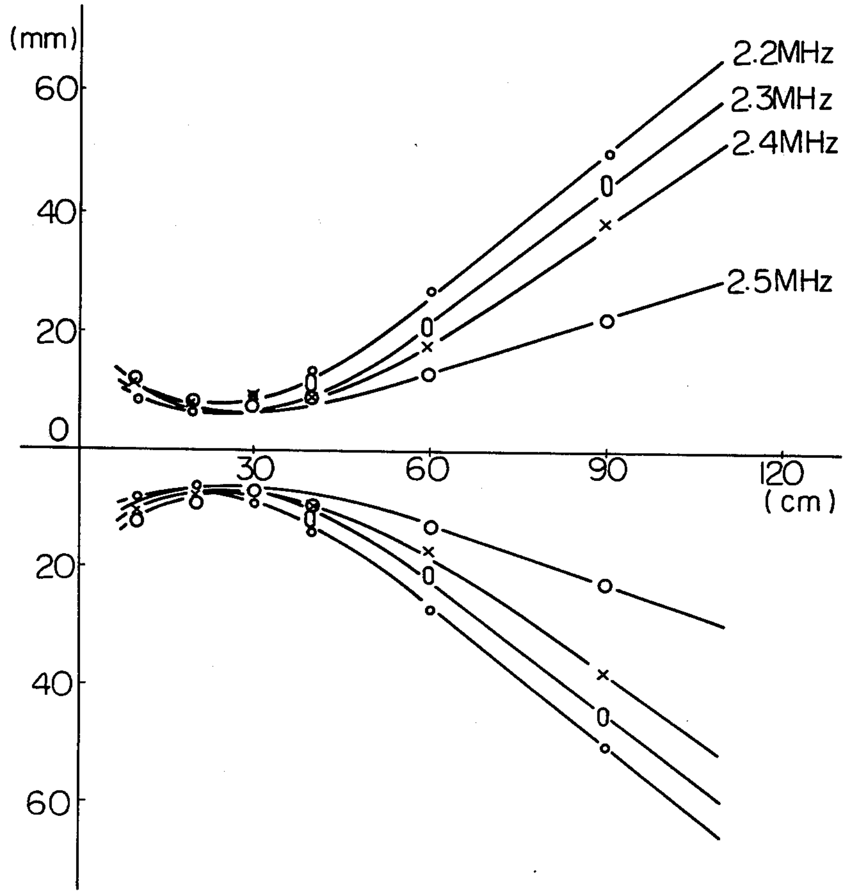
FIG. 5 and FIG. 6 show experimental results of the ultrasonic wave transducer of the invention.
Figure 6:
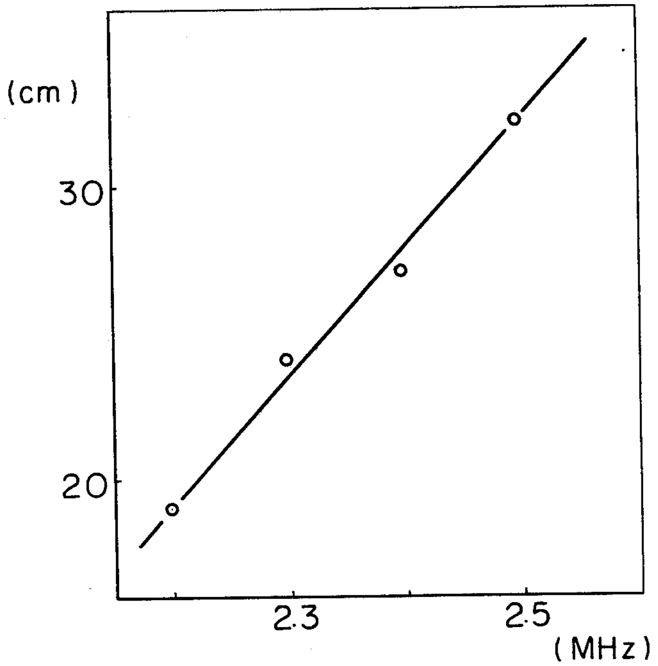

It is also apparent from the above explanation that the characteristics of the convergence of the sound wave depend upon the frequency of the sound wave. FIGS. 5 and 6 show the experimental results on the focus characteristics of a transducer designed for operating at 2.5 MHz in the combination of a 91-A piezoelectric ceramic and water. In FIG. 5, the horizontal axis shows the distance from the sound source, and the vertical axis shows the width of the beam. The curves in FIG. 5 show the variation of the shape of the sound wave beam with the parameter of frequency, and those curves are obtained by measuring the directivity of the sound beam at various frequencies and the shape of the sound beam is obtained from the directivity. The focal length at each frequency can be calculated from the curves in FIG. 5, and the result is shown in FIG. 6.

Further, the experiment shows that the present transducer satisfies a linear focal length vs. frequency relationship, i.e., a transducer of half the size of the electrode pattern shows a focal length of 16 cm (twice the length) at center frequency 5 MHz (twice the frequency) and beam width 3.8 mm. Further, the focal length for each frequency varies similarly.

According to the present invention, the interdigital electrode on the surface of the piezoelectric material in the liquid can supply a convergent ultrasonic wave beam by providing an alternating voltage to said electrode.

The field of application of the present invention is not limited to photography or viewing the internal stracture of a material, but the present invention is also applicable to other fields, which require a convergent sound beam. For instance, liquid can be sprayed by focusing the sound beam at the boundary area of liquid and air.

From the foregoing it will now be apparent that a new and improved ultrasonic wave transducer has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An ultrasonic wave transducer comprising liquid contained in a housing, a piezoelectric material in said liquid, an interdigital electrode arranged on the surface of said piezoelyctric material, means for applying an alternating voltage to said electrode, and the distance between adjacent fingers of said interdigital electrode satisfying the relationship:

$$r_n^2 = k_1 n \lambda_f L + k_2 n^2 \lambda_f^2$$

where $r_n$ is the horizontal length between the n th finger of the electrode and the focal point, $\lambda_f$ is the wavelength of the sound wave in the liquid, L is the vertical length between the electrode and the focal point, and $k_1$ and $k_2$ are constants.

2. An ultrasonic wave transducer according to claim 1, wherein said liquid is one selected from the group consisting of water, ether, acetone and glycerine.

3. An ultrasonic wave transducer according to claim 1, wherein said interdigital electrode is a three phase interdigital electrode and said alternating voltage is three phase voltage.

4. An ultrasonic wave transducer according to claim 1, wherein said interdigital electrode has curved fingers.

5. An ultrasonic wave transducer according to claim 4, wherein said interdigital electrode has circular fingers.

* * * * *

UNITED STATES PATENT AND TRADEMARK OFFICE

CERTIFICATE OF CORRECTION

PATENT NO. : 4,173,009

DATED : October 30, 1979

INVENTOR(S) : Kohji Toda

It is certified that error appears in the above—identified patent and that said Letters Patent is hereby corrected as shown below:

Column 1, line 44: "drawings" should be --drawings wherein--.

line 63: "is thereof" should be --thereof is--.

Column 2, line 13: "is the embodiment of the" should be --shows a--.

last line: "combination" should be --combinations--.

Column 3, line 53: "stracture" should be --structure--.

line 55: Cancel the comma after "fields".

Column 4, line 31: "piezoelyctric" should be --piezoelectric--.

Signed and Sealed this

*Twentieth* Day of *May 1980*

[SEAL]

*Attest:*

SIDNEY A. DIAMOND

*Attesting Officer* *Commissioner of Patents and Trademarks*